Patented July 7, 1925.

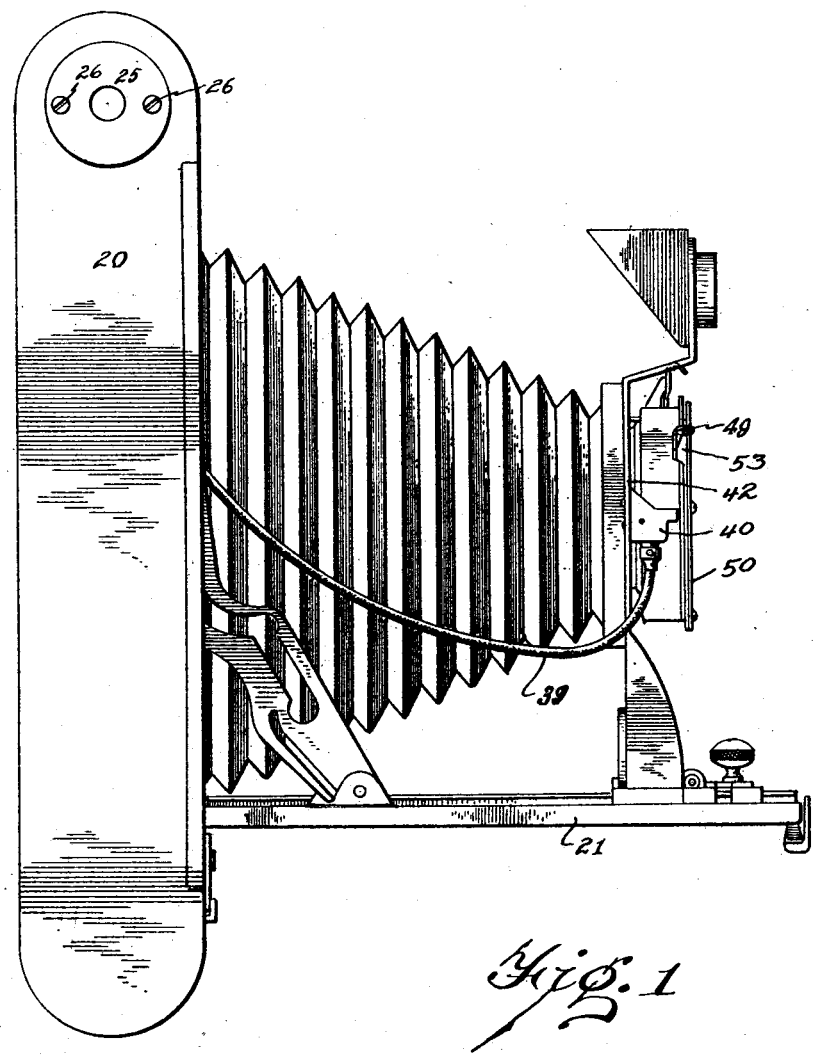

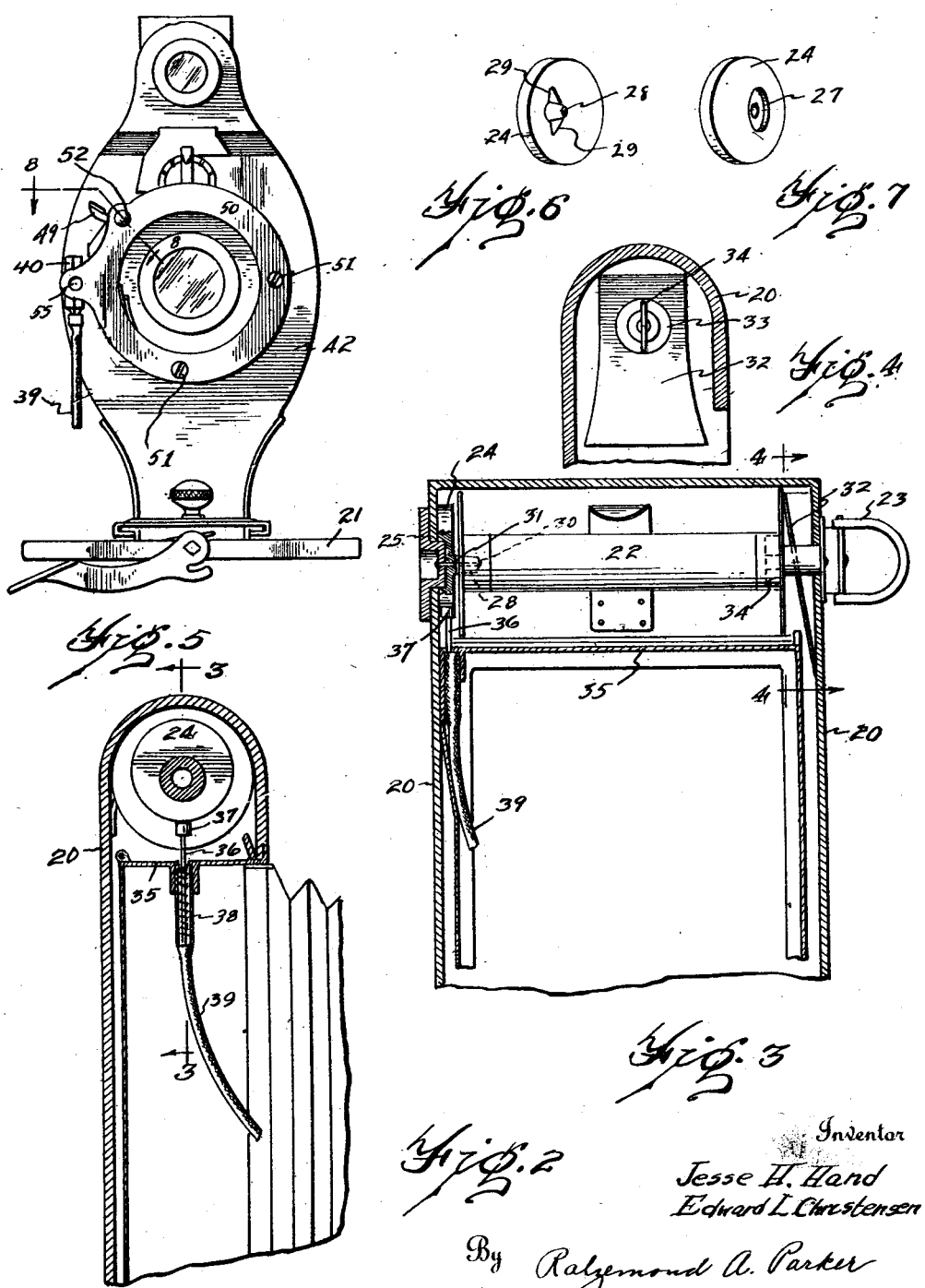

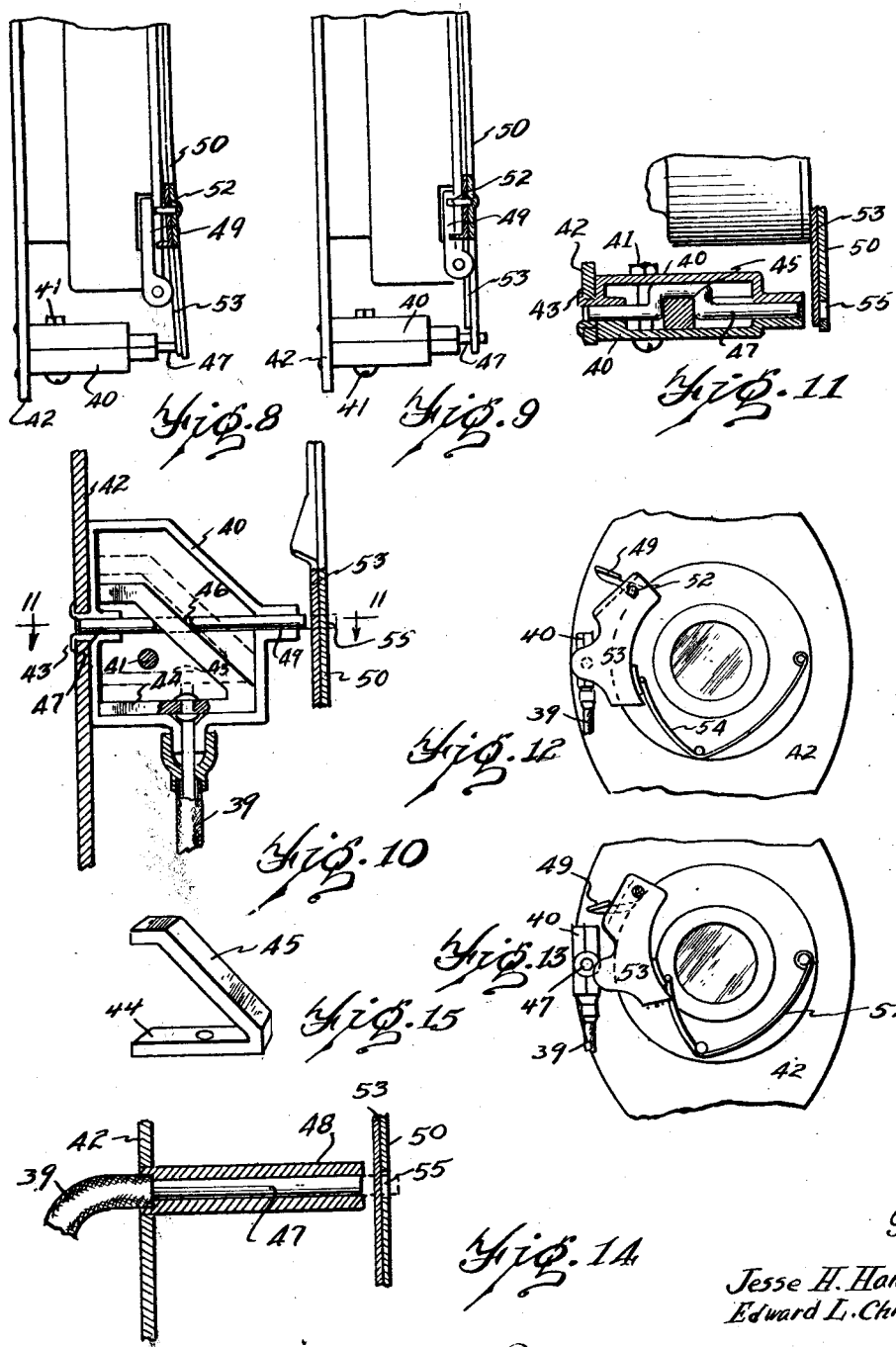

1,544,808

UNITED STATES PATENT OFFICE.

EDWARD L. CHRISTENSEN AND JESSE H. HAND, OF DETROIT, MICHIGAN, ASSIGNORS OF ONE-HALF TO HARRY F. CHRISTENSEN, OF CHICAGO, ILLINOIS, AND ABRAHAM A. ROCHLIN, OF DETROIT, MICHIGAN.

PHOTOGRAPHIC CAMERA.

Application filed February 4, 1922. Serial No. 534,186.

*To all whom it may concern:*

Be it known that we, EDWARD L. CHRISTENSEN and JESSE H. HAND, citizens of the United States, residing at Detroit, county of Wayne, State of Michigan, have invented a certain new and useful Improvement in Photographic Cameras, and declare the following to be a full, clear, and exact description of the same, such as will enable others skilled in the art to which it pertains to make and use the same, reference being had to the accompanying drawings, which form a part of this specification.

Our invention relates to improvements in camera construction through the use of which each successive picture section of the film may be exposed once only.

An object of our invention is to provide a simple, inexpensive mechanism adapted to be easily applied to any of the standard cameras either of the folding, or box, type capable of automatically locking the shutter mechanism after each exposure operation, whether bulb, time or instantaneous against a subsequent exposure operation, without first shifting the film so as to remove the exposed portion of the film and substitute in back of the lens an unexposed section of film.

Amateur users of the camera have particularly felt the need of a suitable simple mechanism for the prevention of double exposure. Not only is the waste of film considerable, due to double exposure, or its reverse, which is the result of over caution, that is of removing an unused section of film from in back of the lens and substituting the succeeding unused section in place thereof; but what is a greater loss from the photographers' point of view is the loss of photographs which may be difficult, if not impossible, to again secure.

We have shown our improvement as applied to a camera of the bellows type provided with a manually-operable shutter lever or trigger. It is obvious that the improvements would fit equally well on a camera provided with the well-known pneumatic type of shutter lever operation. It is likewise apparent that it could be adapted, without departing from the spirit of the invention, to the box type of camera. A necessary adjunct is the roll type of film operation, but the film is today in universal use on hand cameras.

The above, and other objects, together with the method of operation and details of construction, though of course it is understood that we do not intend to confine our invention to the exact structure shown, will more fully appear from the following description, appended claims and accompanying drawings, in which:

Figure 1 is a side elevation of an open camera with our invention applied thereto.

Fig. 2 is a sectional view showing the cam socket end of the film roll with one side of the casing removed.

Fig. 3 is a cross-sectional view taken on line 3—3, Fig. 2.

Fig. 4 is a cross-sectional view taken on the line 4—4, Fig. 3.

Fig. 5 is a front elevational view showing the shutter mechanism casing and lens plate support.

Fig. 6 is a perspective of the end socket cam which is pivoted to the casing at one end of the film roll.

Fig. 7 is a perspective of the reverse side of the socket shown in Fig. 6.

Fig. 8 is a fragmentary view taken on the line 8—8, Fig. 5, showing the shutter mechanism ready for operation.

Fig. 9 is a view taken on the same line as Fig. 8, showing the shutter mechanism locked against operation.

Fig. 10 is a sectional view through the head of the flexible shaft showing the plunger mechanism.

Fig. 11 is a sectional view taken on the line 11—11, Fig. 10.

Fig. 12 is a fragmentary front elevational view of the shutter casing with the outer spring face plate removed, showing the shutter lever in the normal position.

Fig. 13 is a view taken on the same line as that in Fig. 12, showing the shutter lever depressed.

Fig. 14 is a view showing a modified form of plunger mechanism which is actuated by the flexible shaft.

Fig. 15 is a perspective of the wedge member 45.

Our invention is shown as applied to a folding photographic camera of the bellows type in which the casing is indicated as 20, the front-board which is adapted to drop down and serve as a support for the lens plate when in the advance position as shown in Fig. 1, is indicated as 21 and the film roll as 22. The film roll winding key is indicated as 23. We have not shown or described the shutter mechanism as it is of standard construction and forms no part of our invention. The only part of the shutter mechanism which we have shown is the shutter lever or trigger mechanism which is commonly directly actuated by the hand of the operator, though it may be manually actuated by pneumatic mechanism which construction is a common practice.

In standard camera construction a complete reciprocal movement of this shutter lever or reciprocating trigger is involved in each movement of the shutter to expose the film and the return of the shutter lever to again engage the shutter mechanism for a subsequent exposure operation. This mechanism is well known and we have made use of it as it exists, applying our improvement thereto.

To positively assure removal of the exposed section of film from in back of the lens before a succeeding operation of the shutter mechanism to expose the film, it is necessary that the locking means provided for such shutter mechanism be operatively connected with the film roll so that the shutter may be released for operative movement when an unused section of film has been moved into position at the rear of the lens. However, to accommodate my invention to the already provided film roll, and prevent increased cost of this article, we have provided our film roll operating member in the form of a cam disc or end socket adapted to perform a cam action which socket or disc is carried by the camera casing.

Our revolving disc or cam member 24 is eccentrically pivoted on an end-supporting member 25, which member 25 is secured to the casing by means of screws 26, or as may be desired.

This end member is provided with an axial extension which extends through the casing and is received within a recess 27 formed in one face of the cam so as to serve as a supporting bearing for the rotation of the cam. On the reverse face of the cam disk opposite its axis of support is a projecting teat 28 provided with one or more wings 29, which teat is adapted to impinge the end of the film roll so the cam will rotate as one piece with the roll. In common construction these film rolls are made of wood and the member 28 may be easily detachably engaged therewith, as shown in Fig. 3.

The form of teat construction shown is a convenient means of releasably engaging the roll when it is inserted for rotation within the casing. It is obvious that the cam 24 might be differently constructed and yet so mounted as to produce a cam action upon its rotation. This cam acting disk is held in place by means of a pin 31 which secures it to the end supporting member 25.

At the opposite end of the film roll, as the roll is in position in the casing, there is secured to the inner side of the camera casing a flat spring 32 which is adapted to engage the end of the roll flange as the roll is positioned within the casing. This spring exerts end thrust on the roll to force the same into engagement with the teat on the cam disk to pick up the cam for rotation with the roll. This spring 32 is perforated at 33 to permit extension therethrough of the end 33 of the winding key 23, which end of the winding key engages in a provided kerf in the end of the film roll to produce rotation thereof.

By means of this spring the film roll may be easily positioned within or removed from the camera casing. This spring may be made of slightly resilient metal so as to exert a yielding end thrust on the film roll if desired.

A camera of this type of construction is usually provided with a transversely extending partition 35 separating the film roll compartment from the lower compartment into which the bellows and lens and shutter mechanism fold when the camera is closed.

We provide a flexible shaft 36 having a bearing shoe 37 which is held yieldingly against the periphery of the eccentrically pivoted cam 24 by means of a spring 38. The shaft is provided with a flexible casing 39 which is secured at the shoe end to the partition 35, as shown in Fig. 2, so as to hold the shoe yieldingly against the revolving cam 24.

At the opposite end the flexible casing is swivelled to a plunger housing 40, as shown in Fig. 10. This housing is formed in opposed complementary sections secured together by means of screw bolt 41. The housing may be secured to the lens plate 42 so as to be supported thereby as shown at 43.

The shaft itself is provided with an angular wedge-shaped head 44, the sloping face 45 of which, engages in a slot 46 in the plunger 47 to reciprocate the plunger endwise as the head is raised or lowered. The plunger and the head are shown in the withdrawn and lowered positions respectively in full-line in Fig. 10, and in the projected and upraised positions respectively in the dotted lines.

In Fig. 14, we have shown the plunger as a direct continuation of the flexible shaft and adapted to be reciprocated directly through a housing 48 which is fastened to the lens plate 42. The construction in Fig. 10 permits folding of the lens plate back within the camera casing with a less acute bend in the flexible shaft than is possible with the form of attachment shown in Fig. 14.

It will be seen, therefore, that, due to the eccentric mounting of the cam disk and its engagement with the film roll for rotation, with every complete rotation of the film roll the plunger 47 will be projected and withdrawn, thereby completing one reciprocal movement.

The shutter lever, or hand trigger, is indicated as 49, and for each complete reciprocal movement thereof the film is exposed and the shutter lever automatically returned to the starting position from which the shutter mechanism may again be actuated to expose the film. In time exposures requiring repetitive actuation of the shutter, the shutter lever does not return to the initial starting position until after it has been actuated the second time. It is necessary, therefore, to place the shutter mechanism in position for a second exposure, that the first exposure operation be completed and the shutter lever returned to the starting position.

We have provided a face plate 50 of spring metal adapted to be superimposed on the face plate of the shutter housing and held in position by means of screws 51. This resilient face plate carries a laterally-projecting stop, or pin, 52 so disposed with respect to the shutter lever 49 as to engage in the rear thereof when the shutter lever is depressed preventing a return of the shutter lever to the starting position. The construction and mounting of the face plate 50 is such that the stop 52 is held yieldingly inwards against the flat side of the shutter lever when the lever is in the normal position, as shown in Fig. 8. When the shutter lever is depressed the spring tension of the face plate 50 forces the stop into position in the rear thereof so as to prevent the return of the lever to the normal starting position, at which time the parts assume the position indicated in Fig. 9.

When the stop is in the position shown in Fig. 9, preventing the complete return of the shutter lever 49, the shutter lever has not returned sufficiently to permit a second operation of the shutter mechanism although the shutter lever may be reciprocated freely as limited by the stop. There can, therefore, be no action of the shutter mechanism to produce exposure of the film. The pin or stop 52 must be first withdrawn to permit the shutter lever to complete its reciprocal movement before the shutter mechanism may again be operated to produce exposure of the film.

We provide means operable by the reciprocal action of the plunger 47 to retract this stop 52. All that is necessary to retract the stop 52 would be to force the spring plate 50 outwardly by the action of the plunger operated through the rotation of the film roll. Therefore, were the camera so constructed that the amount of rotation necessary to bring a picture film in the rear of the lens was in each instance the same, all that would be necessary would be to provide means adapted to reciprocate the plunger once for each such period of rotation. This is not the case, however, due to the constant increase in size of the film roll as the film is wound therearound.

It is essential, therefore, that irrespective of the position at which the plunger may be halted at the conclusion of the winding operation, whether halted in the retracted or projected position, whenever the shutter lever is operated the stop 52 will automatically engage the lever to prevent its return to the starting position and also that further rotation of the film roll to bring an unused section of film into position in the rear of the lens will retract the stop to release the shutter lever.

A swinging plate 53 is freely pivotally mounted on the stop 52 so as to swing in a small arc from such pivot in and out of the path of the plunger 47. This plate 53 is held yieldingly outwards by means of a spring 54 secured to the face plate of the shutter housing, as shown in Figs. 12 and 13. In Fig. 12 it is shown in the normal position held outwardly in the path of the plunger 47 so as to engage the plunger when it is projected forward. In this position the plate 53 will be forced outwardly in front of the advancing plunger and as this plate is pivoted directly in the rear of the spring face plate 50 it will force this face plate outwardly and retract the stop 52 to release the shutter lever to return to its starting position. The mechanism is shown in this position in Figs. 8 and 12. In Fig. 8, the shutter lever has assumed the normal position and the stop 52 bears against a flat face of such shutter lever. As the film is exposed by the depression of the shutter lever, the turned-over thumb grip of the lever engages the edge of the swinging plate 53, as shown in Fig. 13, and forces the swinging plate inwardly against the tension of spring 54, removing the projecting portion of the plate from the path of the plunger to permit the spring 50 to return to its normal position.

In the operation of the device, therefore, when the shutter lever is depressed and a section of film exposed, the stop 52 springs into position in the rear of the shutter lever and prevents the return of the shutter lever to its starting position. The shutter lever, however, returns almost to the starting position. Actuation of the shutter lever from the position at which it has been arrested by the stop does not further effect the operation of the shutter to expose the film. To operate the shutter mechanism to expose the film, it is necessary to retract the stop 52 in order that the shutter lever may return to its normal position. The camera therefore, when the stop is in place engaging the shutter lever is positively locked against a double exposure of an already exposed section of film. When the mechanism is in this position, therefore, it is notice to the operator that an already exposed film stands in the rear of the lens and before an unexposed portion of film can be brought into position it is necessary to rotate the film roll. The film roll is then rotated and the plunger 47 is projected and as the swinging plate 53 is in the position shown in Figs. 8 and 12 the plunger engages this swinging plate forcing the same against the spring plate 50 and forcing the spring plate 50 outwardly sufficiently to withdraw the stop 52 so as to release the shutter lever to be returned to its starting position, the mechanism assuming the position indicated in Fig. 8. If it is necessary to rotate the film further to bring the film into proper position as will appear through the usual window in the back of the camera casing, this further rotation will not affect in any way the position of the shutter mechanism or the stop 52 as the stop 52 is now in engagement with the side of the shutter lever 49 as shown in Fig. 8.

Suppose, for example, that the necessary amount of rotation of the film roll required to bring an unexposed section of film into position for exposure in the rear of the lens had left the plunger projected as shown in Fig. 8. This position of the plunger would not interfere with the operation of the shutter lever and when the shutter lever was depressed it would swing the swinging plate 53 out of the path of the plunger against the resistance of the swinging plate spring 54 and permit the spring plate 50 to return to its normal position and projects the stop 52 into position to engage the shutter lever to prevent the return thereof to the starting position. The spring plate 50 has an aperture 55 which registers with the end of the plunger 47 to be received thereover when the swinging plate 53 is held back by the shutter lever and the plunger is projected forwardly. The swinging plate 53, when forced outwardly by its spring 54 swings outwardly until it engages the projected plunger 47 and remains at that position until the plunger is retracted by further rotation of the film roll. Once the shutter mechanism is in the starting position the plunger may be reciprocated as many times as desired and its reciprocation does not affect the shutter mechanism. The shutter lever will not be locked against the exposure operation except immediately following an exposure operation. Rotation of the film roll will, in this case, always release the shutter lever to a subsequent operation. If it is possible to actuate the shutter lever and expose a section of film, it is therefore certain that an unexposed section of film is in position to the rear of the lens. If an exposed section of film is in the rear of the lens it is not possible to actuate the shutter lever to produce a shutter exposure operation.

What we claim is:

1. In a photographic camera, in combination, a casing, a removable film roll, a cam rotatably supported by the casing, said cam having a part adapted to detachably engage one end of the film roll for rotation, means to engage the opposite end of the film roll for rotatable support, operable shutter mechanism, means for locking said shutter mechanism against operation, means controlled by the cam for releasing said locking means.

2. In a photographic camera, in combination, a casing, a film roll supported for rotation within the casing, operable shutter mechanism disposed within a casing having a face plate, a spring plate superposed upon the face plate of the shutter mechanism casing, a stop carried by said spring plate adapted to be automatically sprung into place following each operation of the shutter mechanism to prevent a second operation thereof.

3. In a photographic camera, in combination, a casing a film roll supported for rotation within the casing, operable shutter mechanism disposed within a casing having a face plate, a spring plate superposed upon the face plate of the shutter mechanism casing, a stop carried by said spring plate adapted to be automatically sprung into place following each operation of the shutter mechanism to prevent a second operation thereof, and means controlled by the film roll to retract said stop to release the shutter mechanism to operation.

4. In a camera having a rotatably-mounted film roll and a reciprocating shutter-operating member, means adapted to automatically lock the shutter-operating member after each exposure operation against a subsequent exposure operation, releasing means adapted to unlock said shutter-operating member comprising a plunger controlled by the rotation of the film roll and a swinging member held normally yieldingly in position to engage therewith, but adapted to be moved out of the engaging position by actuation of the shutter-operating member.

5. In a camera having a rotatably supported film roll and a reciprocating shutter lever adapted to make a complete reciprocal movement for each shutter exposure operation, a spring control member held yieldingly to engage the said shutter lever after each shutter exposure operation to prevent the return of the shutter lever to the starting position, means operable upon rotation of the film roll to release the shutter-engaging lever mechanism to permit return of the shutter lever to the starting position, and means responsive to the actuation of the shutter lever to place the spring-controlled member into position to engage the same after an operation of the shutter lever.

6. In a camera having a rotatably mounted film roll, operable shutter mechanism mounted within a casing having a face plate, and a reciprocating shutter operating member, a spring metal face plate secured to the aforesaid face plate provided with means for automatically locking said shutter operating member after each exposure operation to prevent subsequent operation thereof, and means controlled by the rotation of the film roll for releasing said locking means.

7. In a camera provided with a rotatably mounted film roll, shutter mechanism disposed within a casing, a spring face plate carried by the casing, means controlled by said face plate operable to lock the shutter mechanism after each operation against a succeeding operation, and means controlled by the film roll to release the shutter mechanism for operation.

8. In a camera provided with a rotatably mounted film roll, shutter mechanism disposed within a casing, a spring face plate having a part operable to lock the shutter mechanism after each operation against a succeeding operation, means controlled by the film roll operable to release the shutter mechanism for operation, and means responsive to shutter operation to control the movement of the face plate to control the operation of the shutter mechanism.

In testimony whereof, we sign this specification.

EDWARD L. CHRISTENSEN.
JESSE H. HAND.